United States Patent
Han et al.

(10) Patent No.: US 9,986,388 B2
(45) Date of Patent: *May 29, 2018

(54) METHOD AND APPARATUS FOR TRANSMITTING AND RECEIVING DATA

(71) Applicant: UNWIRED PLANET INTERNATIONAL LIMITED, Dublin (IE)

(72) Inventors: Jin Kyu Han, Seoul (KR); Youn Sun Kim, Gyeonggi-do (KR)

(73) Assignee: UNWIRED PLANET INTERNATIONAL LIMITED, Dublin (IE)

( * ) Notice: Subject to any disclaimer, the term of this patent is extended or adjusted under 35 U.S.C. 154(b) by 7 days.

This patent is subject to a terminal disclaimer.

(21) Appl. No.: 14/559,441

(22) Filed: Dec. 3, 2014

(65) Prior Publication Data

US 2015/0085737 A1 Mar. 26, 2015

Related U.S. Application Data

(63) Continuation-in-part of application No. 13/267,402, filed on Oct. 6, 2011, now Pat. No. 8,976,746.

(30) Foreign Application Priority Data

Oct. 6, 2010 (KR) ........................ 10-2010-0097291

(51) Int. Cl.
*H04W 4/06* (2009.01)
*H04L 27/26* (2006.01)
*H04L 5/00* (2006.01)

(52) U.S. Cl.
CPC ............. *H04W 4/06* (2013.01); *H04L 5/0058* (2013.01); *H04L 27/2602* (2013.01); *H04L 5/005* (2013.01); *H04L 5/0051* (2013.01)

(58) Field of Classification Search
CPC ........ H04W 4/06; H04L 5/0058; H04L 5/003; H04L 27/2602; H04L 27/26; H04L 5/005; H04L 5/0051
(Continued)

(56) References Cited

U.S. PATENT DOCUMENTS 7,535,968 B2   5/2009   Yu et al.
7,782,968 B2   8/2010   Yu et al.
(Continued)

FOREIGN PATENT DOCUMENTS

WO   WO 2010/087639   8/2010
WO   WO 2011/025218   3/2011

OTHER PUBLICATIONS

Motorola, "On Demodulation-RS and CSI-RS Design and Overhead", R1-091340, TSG-RAN WG1 #56bis, Mar. 23-27, 2009.
(Continued)

*Primary Examiner* — Kwang B Yao
*Assistant Examiner* — Syed M Bokhari

(57) ABSTRACT

An apparatus and method are provided for receiving data by a first transceiver. The method includes receiving information for at least one transmission mode through higher layer signaling from a second transceiver; and receiving data on a first sub-frame based on a first demodulation reference signal (DMRS), if the at least one transmission mode is transmission mode 9 or transmission mode 10 and the first sub-frame is a multimedia broadcast multicast service single frequency network (MBSFN) sub-frame.

14 Claims, 8 Drawing Sheets

(58) Field of Classification Search
USPC .................................. 370/312, 329, 336, 311
See application file for complete search history.

(56) References Cited

U.S. PATENT DOCUMENTS

| | | | |
|---|---|---|---|
| 7,940,740 | B2 | 5/2011 | Krishnamurthy et al. |
| 8,009,617 | B2 | 8/2011 | Sarkar et al. |
| 8,130,869 | B2 | 3/2012 | Yu et al. |
| 8,218,509 | B2* | 7/2012 | McCoy ................. H04L 5/0007 370/329 |
| 8,315,225 | B2 | 11/2012 | Xu et al. |
| 8,325,661 | B2 | 12/2012 | Montojo et al. |
| 8,355,367 | B2 | 1/2013 | Han et al. |
| 8,379,583 | B2 | 2/2013 | Gorokhov et al. |
| 8,379,781 | B2 | 2/2013 | Yang et al. |
| 8,396,160 | B2 | 3/2013 | Kim et al. |
| 8,494,033 | B2 | 7/2013 | Jongren et al. |
| 8,520,781 | B2 | 8/2013 | Weng et al. |
| 8,687,555 | B2* | 4/2014 | Ko ....................... H04L 1/0026 370/328 |
| 8,737,307 | B2 | 5/2014 | Kim et al. |
| 8,797,896 | B2 | 8/2014 | Li et al. |
| 8,873,493 | B2 | 10/2014 | Seo et al. |
| 2009/0290654 | A1 | 11/2009 | Yu et al. |
| 2011/0103286 | A1* | 5/2011 | Montojo ............... H04W 48/08 370/312 |
| 2011/0170496 | A1 | 7/2011 | Fong et al. |
| 2011/0216842 | A1* | 9/2011 | Zhang .................. H04L 5/0051 375/260 |
| 2011/0222485 | A1* | 9/2011 | Nangia ................. H04B 7/0452 370/329 |
| 2011/0274205 | A1 | 11/2011 | Lee et al. |
| 2012/0039228 | A1* | 2/2012 | Wang .................. H04W 76/002 370/311 |
| 2012/0114021 | A1* | 5/2012 | Chung .................. H04B 7/155 375/211 |
| 2014/0192700 | A1* | 7/2014 | Lee ....................... H04L 5/0051 370/312 |

OTHER PUBLICATIONS

Motorola, "Downlink RS Design for Supporting Higher Order SU/MU-MIMO and CoMP", R1-09796, TSG-RAN WG1 #56, Feb. 8-13, 2009.
Panasonic, "R-PDCCH Placement", R1-102042, 3GPP TSG RAN WG1 Meeting #60bis, Apr. 12-16, 2010.
LG Electronics, "Downlink Reference Signal for Higher Order MIMO", R1-090218, 3GPP TSG RAN WG1 Meeting #55bis, Jan. 12-17, 2009.
Samsung, "TX Diversity on MBSFM Subframe", R1-104609, 3GPP TSG RAN WG1 #62, Aug. 23-27, 2010.
Korean Office Action dated Feb. 13, 2017 in corresponding KR Application No. 10-2010-0097291. 4 pages.
Texas Instruments. Common Reference Symbol Mapping/Signaling for 8 Transmit Antenna. 3GPP TSG RA WG1 #56 R1-090591. Athens, Greece, Feb. 9-13, 2009. 8 pages.
3rd Generation Partnership Project; Technical Specification Group Radio Access Network; Evolved Universal Terrestrial Radio Access (E-UTRA); Physical layer procedures (Release 9). 3GPP TS 36.213 V9.3.0 (Sep. 17, 2010). 64 pgs.
Samsung; Independent configuration of Rel-10 features; R1-105411; Oct. 11-15, 2010. 2 pgs.
Panasonic; R-PDCCH placement; R1-101269; Feb. 22-26, 2010. 5 pgs.
Korean Office Action dated Dec. 1, 2017 in corresponding KR App No. 10-2017-0115758. 4 pgs.
Korean Notice of Allowance dated Jun. 20, 2017 in corresponding KR Application No. 10-2010-0097291. 6 pages.

* cited by examiner

METHOD AND APPARATUS FOR TRANSMITTING AND RECEIVING DATA

PRIORITY

This application is a continuation of U.S. Ser. No. 13/267,402, which was filed in the U.S. Patent and Trademark Office on Oct. 6, 2011, and claims priority under 35 U.S.C. § 119(a) to an application filed in the Korean Intellectual Property Office on Oct. 6, 2010, and assigned Serial No. 10-2010-0097291, the content of each of which is incorporated herein by reference.

BACKGROUND OF THE INVENTION

1. Field of the Invention

The present invention relates generally to a method and an apparatus for transmitting and receiving data, and more particularly, to transmitting and receiving data in a $3^{rd}$ Generation Partnership Project (3GPP) Long Term Evolution (LTE) system and an LTE Advance (LTE-A) system.

2. Description of the Related Art

In addition to providing a voice based initial service, a mobile communication system has evolved into a high speed and high quality wireless packet data communication system to provide a data service and a multi-media service. Various mobile communication standards such as High Speed Packet Access (HSPA) and LTE of 3GPP, High Rate Packet Data (HRPD), Ultra Mobile Broadband (UMB) of 3GPP2, and 802.16e of IEEE have been developed to support a high speed and high quality wireless packet data transmission service.

The newest mobile communication system uses an Adaptive Modulation and Coding (AMC) scheme and a channel response scheduling scheme to improve transmission efficiency. When using the AMC scheme, a transmitter may adjust an amount of data to be transmitted according to a channel state. That is, the newest mobile communication system may efficiently transmit a large amount of information in such a manner that the transmitter increases and reduces the amount of data to be transmitted to obtain a reception error probability of a desired level when a channel state is excellent and poor, respectively. When using the channel response scheduling scheme, because the transmitter selectively provides a service to a receiver having an excellent channel state among a plurality of receivers, system capacity is increased compared to when the transmitter provides a service after allotting a channel to one receiver.

For example, the AMC scheme and the channel response scheduling scheme receive feedback of partial Channel State Information (CSI) from a receiver, and apply suitable modulation and encoding techniques at the most efficient determining time point. The AMC scheme and the channel response scheduling schemes are techniques that may improve transmission efficiency in a state that a transmitter acquires sufficient information on a transmission channel. As in a Frequency Division Duplexing (FDD) scheme, when a transmitter does not recognize a state of a transmission channel through a receiving channel, a receiver is designed to report information about a transmission channel to the transmitter. Meanwhile, in the Time Division Duplexing (TDD) scheme, the receiver may not report information about a transmission channel to the transmitter using a characteristic capable of recognizing a state of the transmission channel through a receiving channel.

In recent years, research for changing a Code Division Multiple Access (CDMA) scheme being a multiple access scheme used in $2^{nd}$ Generation Partnership Project (2G) and 2G mobile communication systems from a next generation system to Orthogonal Frequency Division Multiple Access (OFDMA) has been actively performed. Standard organizations such as 3GPP, 3GPP2, and IEEE are attempting standardization with respect to an evolution system using an OFDM or a modified OFDMA, because capacity may be increased in the OFDMA scheme in comparison with the CDMA scheme. One of various factors increasing capacity in the OFDMA scheme is to perform Frequency Domain Scheduling in a frequency axis. As a capacity gain may be obtained through a channel response scheduling scheme according to a channel changing according to time, a greater capacity gain may be obtained when a channel changes according to frequency.

An LTE system uses an OFDMA scheme in a Downlink (DK) and a Single Carrier Frequency Division Multiple Access (SC-FDMA) scheme in an Uplink (UL), and the two schemes involve performing scheduling in a frequency axis.

Meanwhile, a DL of the LTE system supports multiple antenna transmission. A transmitter of the LTE system may include one, two, or four transmission antennae. When the transmitter includes a plurality of transmission antennae, it applies pre-coding to obtain a beam forming gain and a spatial multiplexing gain. In the LTE system, a receiver transmits a Common Reference Signal (CRS) for each transmission antenna to estimate a channel response from each transmission antenna. When adaptive pre-coding is applied to data transmission, a transmitter reports to the receiver to which pre-coding is applied, through a control channel.

A DL of the LTE-A system increases the number of transmission antennae of a transmitter to support a maximum of eight transmission antennae. If the number of the transmission antennae increases, the transmitter may further improve the beam forming gain and the spatial multiplexing gain. However, so as to support the maximum eight transmission antennae, the amount of CRS for estimating a channel state from each transmission antenna is increased. In the LTE-A system, to prevent rapid increase in a rate of the CRS due to the increase in the number of transmission antennae, a receiver uses referring CSI-RS to create CSI feedback information and referring Demodulation-RS (DM-RS) for data demodulation. In the LTE-A system, a newly applied transmission scheme uses CSI-RS and DM-RS. However, to maintain backward compatibility, an LTE-A transmitter should also transmit CRS.

The LTE-A system supports Multimedia Broadcast Multicast Service Single Frequency Network (MBSFN) transmission, which spreads a service zone of broadcasting by transmitting the same broadcasting signal from multiple cells. The MBSFN transmission regulates to transmit the same RS from multiple cells such that a receiver may perform coherence modulation for the simultaneously transmitted signal without cell separation. That is, because the MBSFN cannot be supported with the CRS defined by cells, only an MBSFN dedicated RS is defined in an MBSFN sub-frame and is transmitted. Further, because a unicast service is not supported in the MBSFN sub-frame, the CRS is not transmitted.

The LTE system regulates a plurality of transmission modes to select a suitable transmission scheme according to a state of a receiver, and uses a CRS and a transmission scheme using a Dedicated Reference Signal (DRS) for channel estimation for demodulation. The LTE-A system adds a transmission scheme using DM-RS for channel estimation for demodulation. A receiver of the LTE-A system should be able to receive all of CRS, DRS, and DM-RS in consideration of backward compatibility.

The receiver of the LTE-A system may also receive a unicast service from an MBSFN sub-frame. The DM-RS may be transmitted to an MBSFN sub-frame instead of the CRS because the MBSFN sub-frame is regarded as a source without backward compatibility. Herein, in order to distinguish from an MBSFN sub-frame set for supporting an MBSFN service, a sub-frame set for supporting a unicast service to an MBSFN sub-frame is referred to as an LTE-A sub-frame.

In the foregoing LTE-A system, an operation of a receiver for receiving a unicast service in the MBSFN sub-frame should be defined. When a receiver of the LTE-A system is set to a transmission mode using a CRS for demodulation, it may receive data in a general sub-frame. However, since the CRS is transmitted in the MBSFN sub-frame, although the receiver of the LTE-A system may perform reception using DM-RS, the receiver cannot receive data.

SUMMARY OF THE INVENTION

The present invention has been made in view of the above problems, and an aspect of the present invention is to provide a method and an apparatus for transmitting and receiving data that defines a transmission technique control method such that a transmitter of an LTE-A system may support an existing transmission scheme based on CRS in a normal sub-frame, and a receiver of an LTE-A system may receive data in an LTE-A sub-frame and be set to use the existing transmission scheme based on CRS.

In accordance with an aspect of the present invention, a method is provided for receiving data by a first transceiver. The method includes receiving information for at least one transmission mode through higher layer signaling from a second transceiver; and receiving data on a first sub-frame based on a first demodulation reference signal (DMRS), if the at least one transmission mode is transmission mode 9 or transmission mode 10 and the first sub-frame is a multimedia broadcast multicast service single frequency network (MBSFN) sub-frame.

In accordance with another aspect of the present invention, a method is provided for transmitting data by a first transceiver. The method includes transmitting information for at least one transmission mode through higher layer signaling to a second transceiver; and transmitting data on a first sub-frame based on a first demodulation reference signal (DMRS), if the at least one transmission mode is transmission mode 9 or transmission mode 10 and the first sub-frame is a multimedia broadcast multicast service single frequency network (MBSFN) sub-frame.

In accordance with another aspect of the present invention, an apparatus is provided for receiving data. The apparatus includes a transceiver; and a controller configured to receive, via the transceiver, information for at least one transmission mode through higher layer signaling from another apparatus and to receive, via the transceiver, data on a first sub-frame based on a first demodulation reference signal (DMRS), if the at least one transmission mode is transmission mode 9 or transmission mode 10 and the first sub-frame is a multimedia broadcast multicast service single frequency network (MBSFN) sub-frame.

In accordance with another aspect of the present invention, an apparatus is provided for transmitting data. The apparatus includes a transceiver; and a controller configured to transmit, via the transceiver, information for at least one transmission mode through higher layer signaling to another apparatus, and to transmit, via the transceiver, data on a first sub-frame based on a first demodulation reference signal (DMRS), if the at least one transmission mode is transmission mode 9 or transmission mode 10 and the first sub-frame is a multimedia broadcast multicast service single frequency network (MBSFN) sub-frame.

BRIEF DESCRIPTION OF THE DRAWINGS

The objects, features and advantages of the present invention will be more apparent from the following detailed description in conjunction with the accompanying drawings, in which.

DETAILED DESCRIPTION OF EMBODIMENTS OF THE INVENTION

Embodiments of the present invention are described in detail with reference to the accompanying drawings. The same reference numbers are used throughout the drawings to refer to the same or like parts. Detailed descriptions of well-known functions and structures incorporated herein may be omitted for the sake of clarity and conciseness.

The term "Reference Signal (hereinafter RS) herein indicates a signal previously defined in a transmitter and a receiver for two objects. The first object is to measure a CSI for the transmitter by the receiver. That is, to support an AMC, the transmitter should receive report of a CSI from the receiver, and the receiver may measure the CSI through the RS. The second object is to estimate a channel response for demodulating a signal received by the receiver. For example, when the transmitter transmits a complex signal, the receiver should be able to estimate how a transmission signal is distorted on a channel for coherent demodulation. That is, the receiver may estimate the channel response when receiving the RS.

The LTE system defines an RS used in common in various receivers in a DL cell. This RS is referred to as a Common RS (hereinafter CRS). Since the CRS is defined differently by cells, it is a cell-specific RS. When the transmitter transmits a signal through a multiple transmission antenna, the CRS is orthogonally designed by transmission antennae.

For example, there are two antennae, and the transmitter defines and transmits two orthogonal CRSs through respective transmission antennae.

Figure 1:
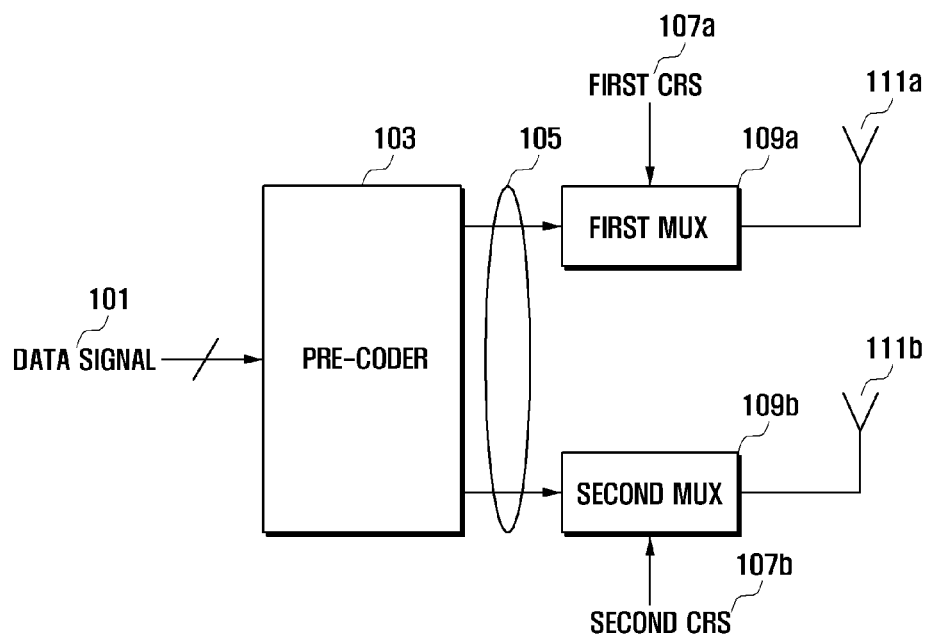
FIG. 1 illustrates a downlink transmitting apparatus using a CRS of a transmitter in an LTE system according to the present invention.

FIG. 1 illustrates a downlink transmitting apparatus using a CRS of a transmitter in an LTE system according to the present invention. In FIG. 1, the transmitter includes two transmission antennae. However, the present invention is not limited thereto. That is, the same explanations are applicable to when the transmitter includes more than two transmission antennae.

Referring to FIG. 1, a transmitter 100 includes a pre-coder 103, a first MUltipleXer (MUX) 109a, a second multiplexer 109b, a first transmission antenna 111a, and a second transmission antenna 111b. The transmitter 100 multiplexes data signals 101 according first and second CRSs 107a and 107b, and transmits the multiplexed signal.

When the pre-coder 103 receives the data signals 101 for a receiver (not shown), it shapes a beam of the data signals 101, which are configured by one or a plurality of layers. When the data signals are configured by one layer, pre-coding corresponds to general beam-shaping. When the data signals 100 are configured by a plurality of layers, the pre-coding is beam-shaped by layers of the data signals 101 for spatial multiplexing.

Pre-coded signals 105 are transmitted to the first multiplexer 109a and the second multiplexer 109b through a processing path. When the pre-coded signals 105 and a first CRS 107a are input to the first multiplexer 109a, the first multiplexer 109a multiplexes the pre-coded signals 105 according the first CRS 107a, and transmits the multiplexed signal through a first transmission antenna 111a. When the pre-coded signals 105 and a second CRS 107b are input to the second multiplexer 109b, the second multiplexer 109b multiplexes the pre-coded signals 105 according to the second CRS 107b, and transmits the multiplexed signal through a second transmission antenna 111b.

In DL transmission using the first and second CRSs 107a and 107b, the data signals 101 are pre-coded, whereas the first and second CRSs 107a and 107b are not pre-coded. A receiver may measure a CSI that is not pre-coded through the first and second CRSs 107a and 107b, and the receiver directly reports the CSI or the most preferential transmission scheme in a given channel situation to the transmitter 100.

The LTE system defines feedback information to be reported to a transmitter in a preferential transmission scheme. A Channel Quality Indicator (CQI), a Pre-coding Matrix Indicator (PMI), and a Rank Indicator (RI) are feedback information defined to support DL transmission in the LTE system. The CQI, the PMI, and the RI indicate modulation and coding schemes capable of being received in respective given channels, the most preferential pre-coding scheme, and the number of spatial multiplexing layers capable of being received, respectively.

However, when reporting the CQI, the PMI, and the RI, because a receiver uses a pre-coding scheme defined in a pre-coding codebook introduced in a standard, the pre-coding scheme is restrictive. For example, a receiver selects and reports the most preferential one of pre-coding matrices to a transmitter, and the transmitter selects a pre-coding scheme from a pre-coding codebook based on the information and applies the selected pre-coding scheme to actual transmission. Accordingly, the transmitter may not apply pre-coding not defined in the pre-coding codebook. For this reason, the LTE system includes information on a pre-coding scheme used in data signals in Downlink Control Information (hereinafter DCI).

The LTE-A system allows a transmitter to apply non-defined pre-coding in a pre-coding codebook. This scheme advantageously allows the transmitter to optionally determine a pre-coding scheme. Thus, a conventional CRS based transmission scheme cannot be used. That is, because the number of pre-coding schemes is infinite, it cannot inform the pre-coding scheme using DCI. Accordingly, the LTE system introduces a reference signal by receivers, namely, a Dedicated RS (DRS) for transmission of only one layer, and the same pre-coding scheme in the data signal is applied to the DRS. Thus, although an applied pre-coding scheme using DCI is not informed, a receiver may estimate a pre-coded channel through DRS to demodulate a pre-coded data signal. The LTE system introduces DM-RS from release-9 to extend the transmission to two layers. The LTE-A system defines eight DM-RSs to support transmission of a maximum eight layers. Although the same pre-coding scheme in the data signal is applied to the DM-RS and an applied pre-coding scheme using DCI is not informed, the receiver may estimate a pre-coded channel through DM-RS to demodulate a pre-coded data signal.

Figure 2:
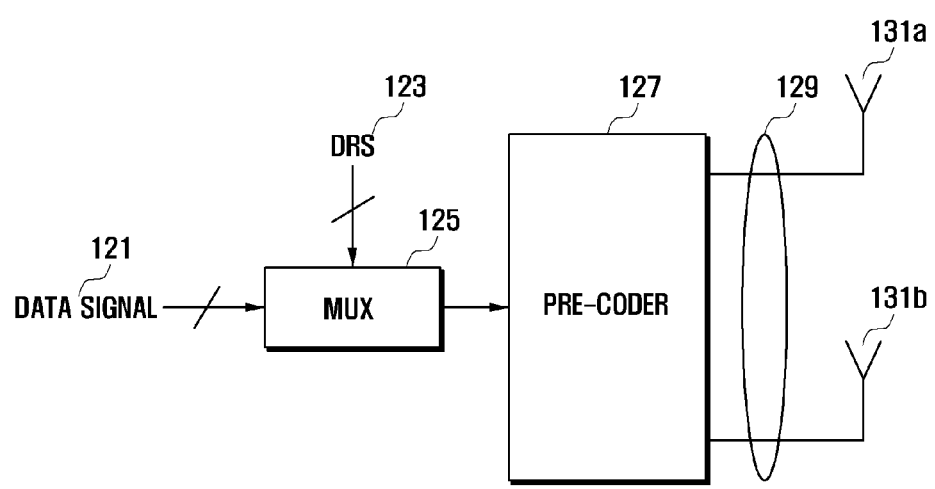
FIG. 2 illustrates a downlink transmitting apparatus using a DRS of a transmitter in an LTE system according to the present invention.

FIG. 2 illustrates a downlink transmitting apparatus using a DRS of a transmitter in an LTE system according to the present invention. In FIG. 2, the transmitter includes two transmission antennae. However, the present invention is not limited thereto. That is, the same explanations are applicable to when the transmitter includes more than two transmission antennae. Moreover, although application of the DRS is limited to transmission of one layer in the LTE system, the DRS concept is applicable to spatial multiplexing configuring and transmitting a maximum eight layers in the LTE-A system.

Referring to FIG. 2, a transmitter 120 includes a multiplexer 125, a pre-coder 127, a first transmission antenna 131a, and a second transmission antenna 131b. The transmitter 120 multiplexes and pre-codes data signals 121 according to a DRS 123, and transmits the multiplexed and pre-coded signal.

When the data signals 121 for a receiver (not shown) and the DRS 123 are input to the multiplexer 125, it multiplexes the data signals 121 according to the DRS 123, and transfers the multiplexed signal to the pre-coder 127, which creates a pre-coded signal 129 and transmits the signal through the first transmission antenna 131a and the second transmission antenna 131b. The pre-coded signal 129 contains the data signal 121 and the DRS 123. A receiver may estimate a channel of the data signals 121 based on the DRS 123 to estimate a pre-coded channel response reflecting both of a pre-coding scheme and a channel response of the DRS 123.

Figure 3:
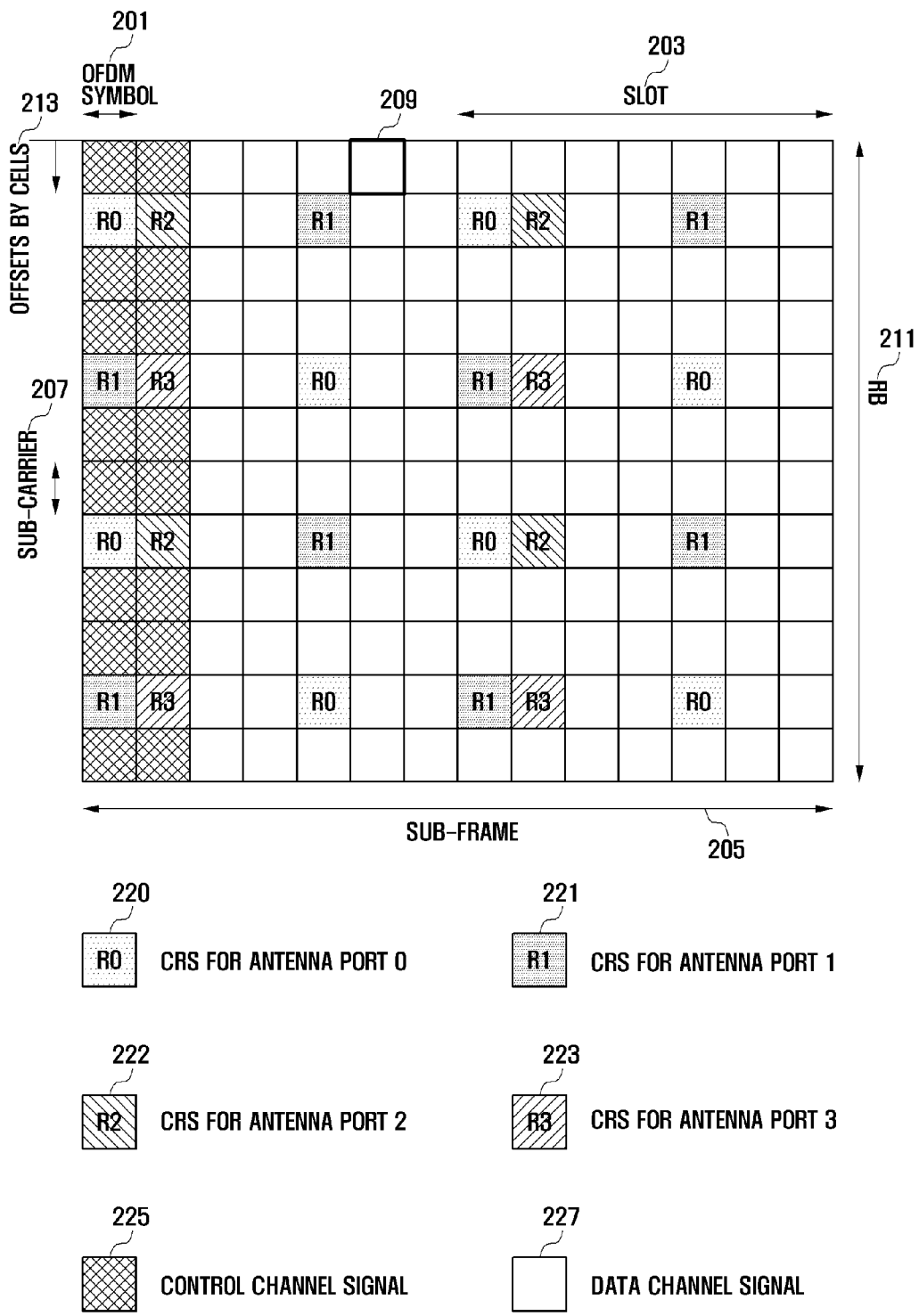
FIG. 3 illustrates an example of downlink resource mapping in an LTE system according to the present invention.

FIG. 3 illustrates an example of downlink resource mapping in an LTE system according to the present invention. It is assumed that a DL resource is implemented by a normal Cyclic Prefix (CP) sub-frame structure. However, the present invention is not limited thereto. That is, the DL resource may be implemented by an Extended CP sub-frame structure.

Referring to FIG. 3, a smallest resource unit in a time axis is an OFDM symbol 201. One slot 203 is configured by seven OFDM symbols 201, and one sub-frame 205 is configured by two slots 203. The sub-frame 205 becomes a basic unit of resource allotment in a time axis. Head One, two, or three OFDM symbols 201 in one sub-frame 205 are used as a control channel region, and remaining OFDM symbols 201 are used as a data channel region. A smallest resource unit in a frequency axis is a sub-carrier 207. One Resource Block (RB) 211 is configured by twelve sub-carriers. The RB 211 becomes a basic unit of resource allotment in a frequency axis. Through this, one sub-carrier 207 in a frequency axis, one OFDM symbol 201 in a time axis, and one antenna port (not shown) in a spatial axis are configured by a Resource Element (RE) 209 being the smallest unit of a resource, and one modulation symbol is transmitted and received as an RE 209.

For example, there are four transmission antennae of a transmitter, namely, four antenna ports, and the transmitter defines and transmits CRSs 220, 221, 222, and 223 for respective antenna ports. That is, in order for a receiver to estimate channels of antenna ports 0, 1, 2, and 3, the transmitter transmits a CRS0 (220) for antenna port 0, a CRS1 (221) for antenna port 1, CRS2 (222) for antenna port 2, and a CRS3 (223) for antenna port 3. The transmitter separates and transmits the CRS0 (220), the CRS1 (221), the CRS2 (222), and CRS3 (223) to different REs 209. Through this, the CRS0 (220), the CRS1 (221), the CRS2 (222), and CRS3 (223) have characteristics that are orthogonal to each other. Moreover, the transmitter transmits a control channel signal 225 and a data channel signal 227 of data signals to an RE 209 of a control channel region, and an RE 209 of a data channel region, respectively. To define locations of the CRSs 220, 221, 222, 223 differently by cells, offsets 213 by cells may determined differently according to cell identification.

In the LTE system, the transmitter may transmit data signals and a reference signal according to a transmission mode (tm, as shown in Table 1 below). Table 1 lists available transmission modes in a DL of the LTE system. Two types of data transmission schemes are supported in each transmission mode. A reference transmission scheme is allowable in a corresponding transmission mode, and a substitute transmission scheme is allowable in all transmission modes in common.

The LTE system supports various reference transmission schemes but does not allow a user to freely select all reference transmission schemes every transmission time. Respective reference transmission schemes require different DCIs, and a receiver should previously know to receive any DCI. Accordingly, if a transmitter sets a certain common transmission mode to one receiver, a corresponding receiver performs a reception operation in a reference transmission scheme of a corresponding common transmission mode. Because the common transmission mode is set through higher layer signaling, time delay may not be avoided in the setting procedure.

If a reference transmission scheme of a common transmission mode set in a certain receiver no longer has a valid channel state, there is a need for a substitute transmission scheme for changing a common transmission mode of a corresponding receiver. Because transmission diversity is most insensitive to channel variation among various reference transmission schemes, the transmission diversity is defined as a substitute transmission scheme with respect to seven types of command transmission modes.

TABLE 1

| Transmission mode | DCI format | Data transmission scheme |
| --- | --- | --- |
| tm1 | 1A | Single antenna transmission, antenna port 0 |
|  | 1 | Single antenna transmission, antenna port 0 |
| tm2 | 1A | Transmission diversity |
|  | 1 | Transmission diversity |

TABLE 1-continued

| Transmission mode | DCI format | Data transmission scheme |
| --- | --- | --- |
| tm3 | 1A | Transmission diversity |
|  | 2A | Open-loop spatial multiplexing |
| tm4 | DCI format 1A | Transmission diversity |
|  | DCI format 2 | Closed-loop spatial multiplexing & Transmission diversity |
| tm5 | DCI format 1A | Transmission diversity |
|  | DCI format 1D | Multi-user MIMO |
| tm6 | DCI format 1A | Transmission diversity |
|  | DCI format 1B | Closed-loop spatial multiplexing (rank-1 limit) |
| tm7 | DCI format 1A | Transmission diversity |
|  | DCI format 1 | Single antenna transmission, antenna port 5 |
| tm8 | DCI format 1A | Transmission diversity |
|  | DCI format 2B | Duplex layer transmission: antenna port 7 or 8 Single antenna transmission: antenna port 7 or 8 |
| tm9 | DCI format 1A | Transmission diversity |

Transmission modes 1 to 6 listed in Table 1 support a reference transmission scheme based on CRS, whereas transmission modes 7 to 10 support a reference transmission scheme based on DRS (antenna port 5) or DM-RS (antenna ports 7, 8, 9, 10, 11, 12, 13, and 14).

The reference transmission scheme based on CRS includes single antenna transmission in a transmitter having only one transmission antenna, transmission diversity for acquiring spatial diversity, open-loop spatial multiplexing performing spatial multiplexing transmission without feedback regarding a spatial channel state, closed-loop spatial multiplexing performing spatial multiplexing transmission based on feedback regarding a spatial channel state, multi-user Multiple Input Multiple Output (MIMO) transmitting a plurality of user signals with different shaped beams in the same resource, and closed-loop rank-1 pre-coding transmitting a single layer based on feedback regarding a spatial channel state.

Further, the LTE system enables a scheme estimating a channel response using a DRS as a common transmission mode, and designates a DRS as an RS for an antenna port 5, which indicates single antenna transmission, or antenna port 5 scheme.

A transmission mode 8 is added in a Release-9 of the LTE system. Antenna ports 7 and 8 being DM-RS are provided, and support spatial multiplexing based on DM-RS instead of CRS.

Transmission modes 9 and 10 are added in a Release-10 of the LTE-A system. In order to support a maximum eight layers of spatial multiplexing, antenna ports 9, 10, 11, 12, 13, and 14 are defined in additional DM-RS antenna ports 7 and 8.

For example, the LTE-A system supports transmission modes 1-6 being CRS based transmission mode, and transmission modes 7-10 being a transmission mode based on DM-RS including DRS.

Each transmitter of the LTE system and the LTE-A system transmits a CRS in all sub-frames. Accordingly, a receiver may receive the CRS from all sub-frames and uses it to estimate a channel of a data signal. However, there is an exception in that a CRS in an MBSFN sub-frame for supporting MBSFN transmission is not transmitted to a data channel region.

The MBSFN transmission scheme spreads a service zone of broadcasting by transmitting the same broadcasting signal from multiple cells. The MBSFN transmission regulates to transmit the same RS from the multiple cells such that a receiver may perform coherence modulation for the simultaneously transmitted signals from the transmitter without separation by cells.

Only an MBSFB dedicated RS is defined in the MBSFN sub-frame and is transmitted. Accordingly, when a receiver of the LTE system receives a unicast service, because a CRS in the MBSFN sub-frame is not transmitted, a data channel signal is not received in the MBSFN sub-frame. For the operation, the transmitter informs the receiver of the LTE system having received the unicast service of setting the MBSFN sub-frame through upper signaling, and the receiver previously recognizes which sub-frame is the MBSFN sub-frame.

Figure 4:
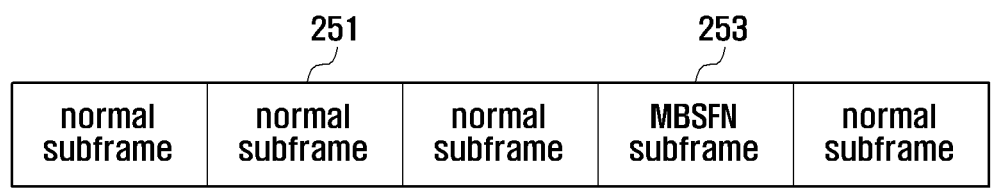
FIG. 4 illustrates TDD of an MBSFN sub-frame.

FIG. 4 illustrates TDD of an MBSFN sub-frame.

Referring to FIG. 4, it is checked whether a normal sub-frame 251 and an MBSFN sub-frame 253 are time-divided. The receiver extracts a CRS from the normal sub-frame 251 to estimate a channel of a data signal. Meanwhile, the receiver does not receive a data channel signal from the MBSFN sub-frame 253.

Using the foregoing feature, the LTE-A system may use the MBSFN sub-frame as an optimized resource for the receiver. Because the LTE-A system should maintain backward compatibility with the LTE system, a transmitter should always transmit a CRS in a normal sub-frame. However, a receiver of the LTE-A system may set a transmission mode to not refer to the CRS in reception of the data channel signal. That is, in a received mode of the LTE-A system, a resource used in CRS transmission is discarded. However, because it is expected that a CRS in a data channel region of the MBSFN sub-frame is not transmitted in the receiver of the LTE system, the receiver of the LTE system recognizes an LTE-A sub-frame as the MBSFN sub-frame, and recognizes an LTE-A sub-frame as a sub-frame optimized for the LTE-A system. Since the CRS in the LTE-A sub-frame is not transmitted, the amount of a resource allotted to the data channel signal may be increased in a side of the receiver of the LTE-A system to increase data transmission efficiency or improve data reception performance.

Figure 5:
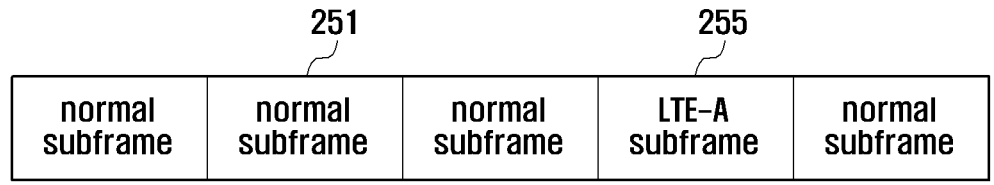
FIG. 5 illustrates TDD of an LTE-A sub-frame.

FIG. 5 illustrates TDD of an LTE-A sub-frame.

Referring to FIG. 5, it is checked whether a normal sub-frame 251 and an LTE-A sub-frame 255 are time-divided. The LTE-A sub-frame is recognized in a receiver of an LTE system as an MBSFN sub-frame, whereas it is recognized in a receiver of an LTE-A system as a sub-frame optimized for the LTE-A system. That is, the transmitter simultaneously transmits a CSR and DM-RS for demodulation of a receiver of the LTE system in a normal sub-frame 251 for backward compatibility. However, only DM-RS for the receiver of the LTE-A system in the data channel region of the LTE-A sub-frame 255 may be transmitted without CRS.

In a DL of the LTE-A system, a transmitter transmits a CRS for the receiver of the LTE system, and transmits DM-RS for the receiver of the LTE-A system. The DM-RS is a spread DRS to support spatial multiplexing. Because it is assumed that a data signal may configure a maximum of eight spatial layers, a maximum of eight types of DM-RS are defined so that a transmitter may apply optional pre-coding. If the pre-coding is limited to a pre-coding codebook, it is not suitable to a multi-user MIMO, and a DCT for supporting Coordinated Multi-Point (CoMP) Joint Transmission (JT) becomes significantly complicated. To efficiently support a transmission scheme to be newly introduced in the LTE-A system, a new DM-RS is introduced instead of reusing the CRS.

However, in a normal sub-frame, the transmitter should transmit a CRS for a receiver of an LTE system and DM-RS for an LTE-A system, respectively. Although a transmission scheme of an LTE-A system using DM-RS is efficient, if two types of RS are always transmitted, a large amount of resources may be unnecessarily consumed in the RS. For this reason, lower data transmission rate may be obtained in a transmission scheme of an LTE-A system using DM-RS in comparison with that of the LTE system. Accordingly, a receiver of the LTE-A system may receive a data signal selectively using a CRS as in the receiver of the LTE system to improve a data transmission rate.

To set a transmission mode using a multiple transmission antenna in a DL of the LTE system, upper signaling as illustrated in Table 2 below is defined. That is, the upper signaling includes a situation information element for informing a multiple transmission antenna relation situation for each receiver, and for example, may be defined as 'AntennaInfoDedicated' including a mode information element for defining a transmission mode of the LTE system. The mode information element may be defined as 'transmissionMode', and informs which transmission mode is set as 3 bit information. If the mode information element 'transmissionMode' is set to tmA, it indicates that the mode information element 'transmissionMode' is set as a transmission mode A. For example, if tm3 is set, it indicates that a transmission mode 3 is set.

TABLE 2

AntennaInfoDedicated :: = SEQUENCE {
   transmissionMode            ENUMERATED {
                                tm1, tm2, tm3, tm4, tm6, tm7, tm8},
   the remainder is omitted
}

Transmission modes 9 and 10 are added in a DL of the LTE-A system. Accordingly, the transmission mode may not be set with 'AntennaInfoDedicated' as illustrated in Table 2. As a result, the receiver of the LTE-A system receives upper signaling of 'AntennaInfoDedicated-rel10' to be described later to recognize the transmission mode.

A first embodiment of the present invention defines both of mode information elements 'transmissionMode-rel10' and 'transmission ModeMBSFN-rel10' as illustrated in Table 3 below. The mode information element 'transmissionMode-rel10' is for informing which transmission mode is set in a general situation applicable to both a normal sub-frame and an LTE-A sub-frame. If one of transmission modes 7, 8, 9, and 10 is set, it performs as a DM-RS based transmission mode in all sub-frames. However, when one of the transmission modes 1, 2, 3, 4, 5, and 6 is set, the set mode corresponds to a CRS based transmission mode, which is not applicable to an LTE-A sub-frame but is applicable to only a normal sub-frame to which a CRS is transmitted. That is, a receiver set in the CRS based transmission mode may not receive a data channel signal from the LTE-A sub-frame.

To solve the problem, a mode information element of 'transmissionModeMBSFN-rel10' is additionally defined, and is configured with 4-bits indicating in which transmission mode a receiver of an LTE-A system is set in the LTE-A sub-frame. Because a CRS in the LTE-A sub-frame is not transmitted, one of transmission modes 7, 8, 9, and 10 being a DM-RS based transmission mode is selected.

TABLE 3

| AntennaInfoDedicated-rel10 :: = | SEQUENCE { |
|---|---|
| TransmissionMode-re110 | ENUMERATED { |
| | tm1, tm2, tm3, tm4, tm6, tm7, |
| | tm8, tm9, tm10, reserved1, |
| reserved2, | |
| | reserved3, reserved4, reserved5, |
| | reserved6,}, |
| transmissionModeMBSFN-rel10 ENUMERATED { | |
| | tm7, tm8, tm9, tm10}, |
| the remainder is omitted | |
| } | |

A second embodiment of the present invention always defines a mode information element 'transmissionMode-rel10' as illustrated in Table 4 below. However, to maintain a transmission mode indicated by a mode information element 'transmissionMode-rel10' in an LTE-A sub-frame, a transmitter of an LTE-A system may omit the mode information element 'transmissionModeMBSFN-rel10'. Table 4 indicates a structure of upper signaling of 'AntennaInfoDedicated-rel10' for supporting this embodiment. In contrast with the first embodiment, 'transmissionModeMBSFN-rel10' is selectively set by a transmitter. When a receiver of an LTE-A system is set in a DM-RS based transmission mode by 'transmissionMode-rel10' but 'transmissionModeMBSFN-rel10' is not set, it regards as a DM-RS based transmission mode set by 'transmissionMode-rel10' in an LTE-A sub-frame and receives a data channel signal.

TABLE 4

| AntennaInfoDedicated-rel10 :: = | SEQUENCE { |
|---|---|
| TransmissionMode-re110 | ENUMERATED { |
| | tm1, tm2, tm3, tm4, tm6, tm7, |
| | tm8, tm9, tm10, reserved1, |
| reserved2, | |
| | reserved3, reserved4, reserved5, |
| | reserved6,}, |
| transmissionModeMBSFN-rel10 ENUMERATED { | |
| | tm7, tm8, tm9, tm10} OPTIONAL, |
| the remainder is omitted | |
| } | |

A third embodiment of the present invention does not support a transmission mode 7 being a DRS based transmission mode in a mode information element 'transmissionModeMBSFN-rel10', but instead supports only transmission modes 8, 9, and 10 as illustrated in Table 5 below. That is, only one of the transmission modes 8, 9, and 10 is set in the LTE-A sub-frame. Table 5 is a structure of upper signaling of 'AntennaInfoDedicated-rel10' for supporting this embodiment.

TABLE 5

| AntennaInfoDedicated-rel10 :: = | SEQUENCE { |
|---|---|
| TransmissionMode-re110 | ENUMERATED { |
| | tm1, tm2, tm3, tm4, tm6, tm7, |
| | tm8, tm9, tm10, reserved1, |
| reserved2, | |
| | reserved3, reserved4, reserved5, |
| | reserved6,}, |

TABLE 5-continued

| transmissionModeMBSFN-rel10 ENUMERATED { | |
|---|---|
| | tm8, tm9, tm10, reserved}, |
| the remainder is omitted | |
| } | |

A fourth embodiment of the present invention does not support transmission modes 7 and 8 being DRS or DM-RS based transmission mode defined in LTE Release-8 and Release-9 of a mode information element 'transmissionModeMBSFN-rel10' but supports transmission modes 9 and 10 newly added in an LTE-A as illustrated in Table 6 below. That is, only one of transmission modes 9 and 10 is set in the LTE-A sub-frame. Table 6 indicates a structure of upper signaling of 'AntennaInfoDedicated-rel10' for supporting this embodiment. The 'transmissionModeMBSFN-rel10' is 1-bit information in this embodiment.

TABLE 6

| AntennaInfoDedicated-rel10 :: = | SEQUENCE { |
|---|---|
| TransmissionMode-re110 | ENUMERATED { |
| | tm1, tm2, tm3, tm4, tm6, tm7, |
| | tm8, tm9, tm10, reserved1, |
| reserved2, | |
| | reserved3, reserved4, reserved5, |
| | reserved6,}, |
| transmissionModeMBSFN-rel10 ENUMERATED { | |
| | tm9, tm10, reserved}, |
| the remainder is omitted | |
| } | |

A fifth embodiment of the present invention may set all transmission modes with 'transmissionModeMBSFN-rel10' as illustrated in Table 7 below. If one of transmission modes 1, 2, 3, 4, 5, and 6 being a CRS based transmission mode is set in a mode information element 'transmissionModeMBSFN-rel10', a receiver estimates a channel using a CRS which is absent in a data region of an LTE-A sub-frame, but is present in a control channel and a peripheral sub-frame and receives a data channel signal transmitted in a CRS based transmission scheme.

TABLE 7

| AntennaInfoDedicated-rel10 :: = | SEQUENCE { |
|---|---|
| TransmissionMode-re110 | ENUMERATED { |
| | tm1, tm2, tm3, tm4, tm6, tm7, |
| | tm8, tm9, tm10, reserved1, |
| reserved2, | |
| | reserved3, reserved4, reserved5, |
| | reserved6,}, |
| transmissionModeMBSFN-rel10 ENUMERATED { | |
| | tm1, tm2, tm3, tm4, tm6, tm7, |
| | tm8, tm9, tm10, reserved1, |
| reserved2, | |
| | reserved3, reserved4, reserved5, |
| | reserved6,}, |
| the remainder is omitted | |
| } | |

Figure 6:
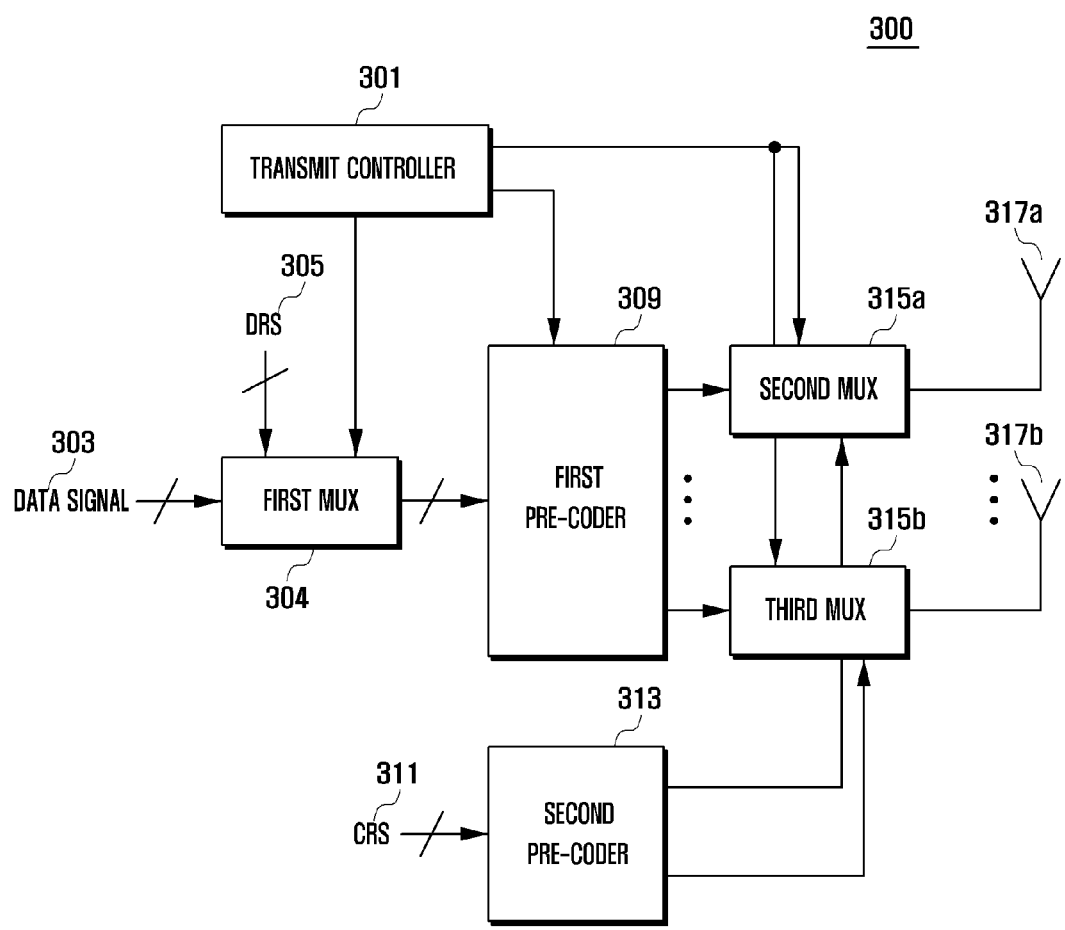
FIG. 6 illustrates a structure of a transmitter according to the present invention.

FIG. 6 illustrates a structure of a transmitter according to the present invention. In FIG. 6, the transmitter includes two transmission antennae. However, the present invention is not limited thereto. That is, the same explanations are applicable to when the transmitter includes more than two transmission antennae.

Referring to FIG. 6, a transmitter 300 includes a transmission controller 301, a first multiplexer 304, a first pre-coder 309, a second pre-coder 313, a second multiplexer 315*a*, a third multiplexer 315*b*, a first transmission antenna 317a, and a second transmission antenna 317b. The transmitter 300 multiplexes data signals 303 according to a DM-RS 305 or a CRS 311, and transmits the multiplexed signal. In an LTE-A sub-frame, the transmitter 300 transmits a DM-RS 305 but does not transmit a CRS 311 in a data region. In a normal sub-frame, the transmitter 300 transmits a CRS 311 to maintain backward compatibility, and additionally transmits a DM-RS 305, if necessary, according to a transmission mode set in a receiver of an LTE-A system.

The transmission controller 301 determines which of an LTE-A sub-frame or a normal sub-frame is a current sub-frame. If the current sub-frame is the LTE-A sub-frame, the transmission controller 301 performs a control operation to generate and transmit data signals 303 and a DM-RS 305. In this case, the transmission controller 301 determines a DCI format with reference to a transmission mode for an LTE-A sub-frame set in a scheduled receiver. The number of DM-RSs 305 is determined according to the number of spatial multiplexing layers, and is reported to a receiver through a DCI transmitted with PDCCH.

If the current sub-frame is the normal sub-frame, the transmission controller 301 performs a control operation to generate and transmit the data signals 303 and the CRS 311, and a DM-RS 305, if necessary, according to the transmission mode set in a receiver of the LTE-A system. In this case, the transmission controller 301 determines a DCI format with respect to a general transmission mode set in a scheduled receiver. In a CRS based transmission mode, the DM-RS 305 is not transmitted, and pre-coding information used when a transmitter transmits a data channel signal is reported through a DCI or is regarded by a preset transmission mode. The number of DM-RSs 305 is determined by the number of spatial multiplexing layers, and is reported to a receiver through the DCI transmitted with the PDCCH.

When the data signals 303 and the DM-RS 305 are input to the first multiplexer 307, it multiplexes the data signals 303 according to the DM-RS 305 and transfers the multiplexed signal to the first pre-coder 309, which applies the same pre-coding to the data signals 303 and the DM-RS 305. When the data inputs 300 are input to the first multiplexer 307 without the DM-RS 305, it multiplexes the data signals 300 and transfers the multiplexed signal to the first pre-coder 309, which also pre-codes the data signal 303. In the case, the transmission controller 301 determines which pre-coding is applied for a specific receiver in the first pre-coder 309.

When a CRS 311 is input to the second pre-coder 313, it applies a fixed pre-coding to the CRS 311. The fixed pre-coding indicates that pre-coding remains the same and is not changed according to a channel state of a receiver. The fixed pre-coding is applied because a rule arranging a maximum of four CRSs of an LTE system in maximum transmission antennae should be applied, since a receiver of an LTE system recognizes that an LTE-A system has a maximum of four transmission antennae although an LTE-A system may include up to eight transmission antennae. Such a procedure is referred to as antenna virtualization. In this case, the pre-coder 313 determines how to arrange the CRS in the first transmission antenna 317a and the second transmission antenna 317b.

When the data signal 303 and the DM-RS 305 pre-coded from the first pre-coder 309 are input to the second multiplexer 315a and the third multiplexer 315b, they multiplex the data signals 330 according to the DM-RS 305 and transmit the multiplexed signal through the first transmission antenna 317a and the second transmission antenna 317b. When the pre-decoded data signal 303 from the first pre-coder 309 and the pre-coded CRS 311 from the second pre-coder 313 are input to the second multiplexer 315a and the third multiplexer 315b, they multiplex the pre-decoded data signal 303 according to the CRS 311 and transmit the multiplexed signals through the first transmission antenna 317a and the second transmission antenna 317b, respectively.

Figure 7:
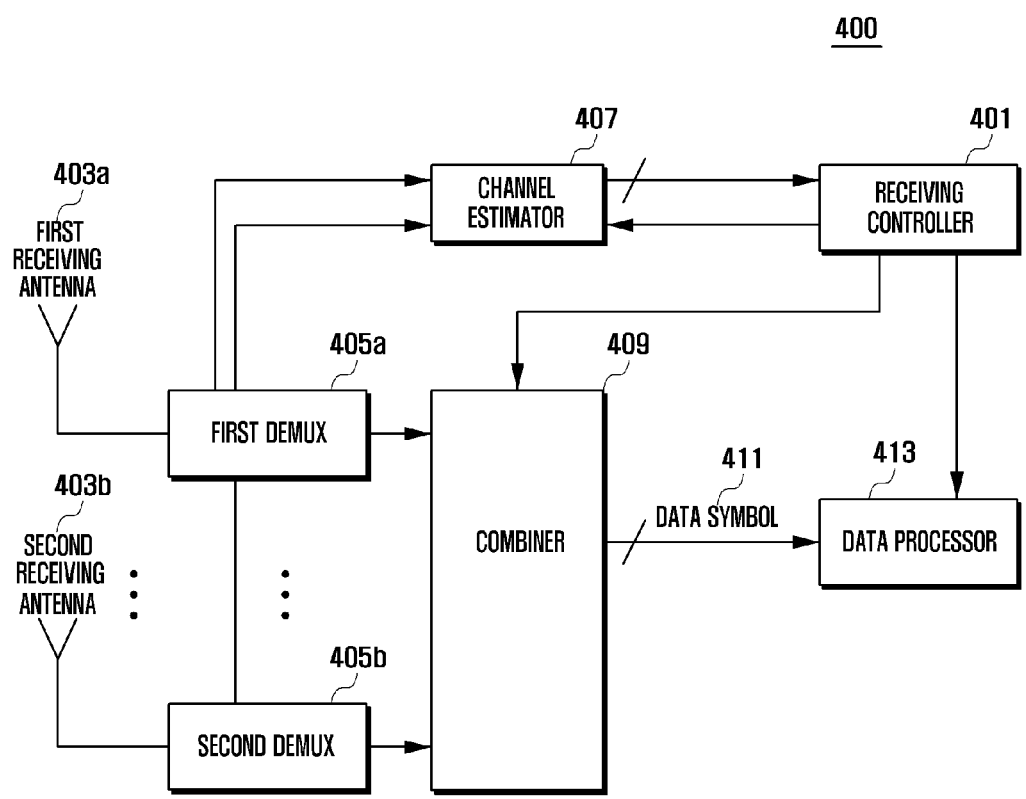
FIG. 7 illustrates a structure of a receiver according to the present invention.

FIG. 7 illustrates a structure of a receiver according to the present invention. In FIG. 7, the receiver includes two receiving antennae. However, the present invention is not limited thereto. That is, the same explanations are applicable to when the receiver includes more than two receiving antennae.

Referring to FIG. 7, a receiver 400 includes a receiving controller 401, a first receiving antenna 403a, a second receiving antenna 403b, a first demultiplexer (DEMUX) 405a, a second demultiplexer 405b, a channel estimator 407, a combiner 409, and a data processor 413.

The receiving controller 401 analyzes upper signaling to determine which of an LTE-A sub-frame or a normal sub-frame is a current sub-frame, and determines the following with reference to a transmission mode set in a receiver and control information DCI provided through PDCCH.

The receiving controller 401 determines:
 i. whether an RS to be used in channel estimation for demodulation is CRS or DM-RS (according to a transmission mode previously set through upper signal);
 ii. how many DM-RSs should be estimated when the DM-RS is used for channel estimation of demodulation (based on DCI provided through PDCCH);
 iii. which format DCI including a data receiving method and resource allot information is assumed to receive PDCCH (based on a transmission mode previously set by upper signaling); and
 iv. in which resource the data channel signal is received (based on DCI transmitted through PDCCH).

When the first receiving antenna 403a and the second receiving antenna 403b receive signals, the first demultiplexer 405a and the second demultiplexer 405b demultiplex the signals to divide the signals into an RS and data signals. In this case, the first demultiplexer 405a and the second demultiplexer 405b transfer the RS to the channel estimator 407, and transfer the data signals to the combiner 409.

The channel estimator 407 estimates a channel using an input RS. When the receiving controller 401 determines whether the current sub-frame is the LTE-A sub-frame, the channel estimator 407 receives a PDCCH according to a transmission mode for the LTE-A sub-frame, and acquires DCI information and determines which RS will be used to estimate a channel. The receiving controller 402 instructs the channel estimator 407 to estimate a channel necessary for demodulation. However, if the transmission mode for the LTE-A sub-frame is not set or is set as a CRS based transmission mode, the receiving controller 401 determines that a data channel signal in the LTE-A sub-frame is not transmitted and terminates a receiving procedure of the data channel signal. However, when a transmitter sets by force to receive a data channel signal from the LTE-A sub-frame using a CRS included in a control channel region and a peripheral sub-frame, the receiving controller 401 instructs the channel estimator 407 to estimate a channel using the CRS included in the control channel region and the peripheral sub-frame.

When it is determined that a current sub-frame is a normal sub-frame, the receiving controller 401 receives data signals and estimates a channel according to a transmission mode set in a mode information element "transmissionMode-rel10". That is, when a CRS based transmission mode is set in the "transmission Mode-rel10", the receiving controller 401 receives a PDCCH according to a corresponding transmission mode to acquire DIC information, and instructs the channel estimator 407 to estimate a channel necessary for demodulating a data channel signal using the CRS. If a DM-RS based transmission mode is set in "transmissionMode-rel10", the receiving controller 401 receives a PDCCH according to a corresponding transmission mode to acquire DCI information, and instructs a channel estimator 407 to estimate a channel necessary for demodulating a data channel signal using a DM-RS.

The channel estimator 407 applies a channel estimating method according to a pattern of an RS indicated by the receiving controller 401 to estimate a channel, and transfers the estimated channel to the receiving controller 401. Through this, the receiving controller 401 determines a combining coefficient indicating the manner in which data signals received by the first receiving antenna 403a and the second receiving antenna 403b are to be combined. The receiving controller 401 transfers the combining coefficient to the combiner 409.

The data signals and the combining coefficient are input to the combiner 409, which suitably combines the data signals according to the combining coefficient to obtain a restored data symbol 411. The data processor 413 demodulates and decodes the data symbol 411 to restore an information bit row. In this case, the data processor 413 may perform suitable demodulation and decoding according to transfer of a modulation and coding method reported with a DCI from the receiving controller 401.

A procedure for receiving a data channel signal in a data channel region by a receiver will be described in detail.

Figure 8:
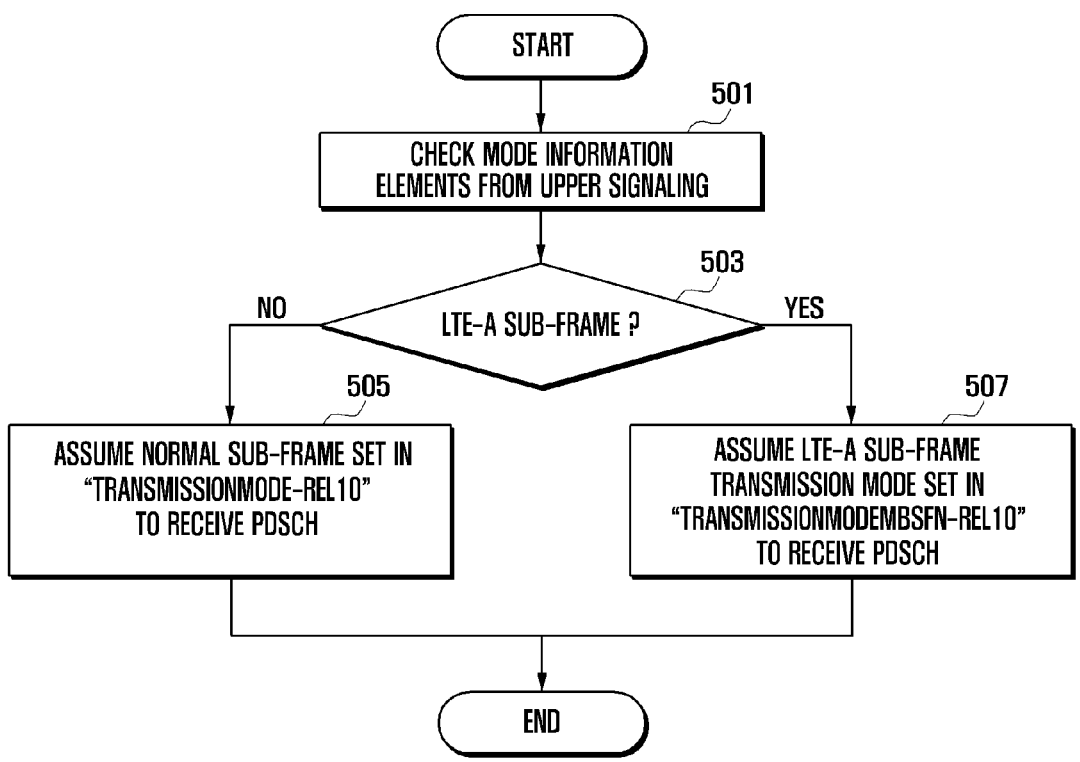
FIG. 8 illustrates a method for using a reference signal by a receiver according to a first, third, or fourth embodiment of the present invention.

FIG. 8 illustrates a method for using a reference signal by a receiver according to a first, third, or fourth embodiment of the present invention.

Referring to FIG. 8, a receiver of an LTE-A system determines mode information elements, namely, "transmission Mode-rel10" and "transmissionModeMBSFN-rel10" from a situation information element of upper signaling, namely, "AntennaInfoDedicated-rel10" (501). The receiver may recognize a transmission mode set in a receiver corresponding to a current sub-frame, and may recognize a transmission mode set in a corresponding received from transmission modes 1 to 10 in Table 1 based on a mode information element. The receiver determines whether a current sub-frame is an LTE-A sub-frame (503).

If the current sub-frame is a normal sub-frame, the receiver assumes a normal sub-frame mode set in "transmissionMode-rel10" to receive a data channel signal (505). In this case, the receiver may receive the data channel signal according to one of transmission modes 1 to 10 in Table 1. Conversely, if the current sub-frame is the LTE-A sub-frame, the receiver assumes an LTE-A sub-frame transmission mode set in "transmissionModeMBSFN-rel10" to receive the data channel signal (507). The receiver may receive the data channel signal according to one of transmission modes 7 to 10 in Table 1.

Figure 9:
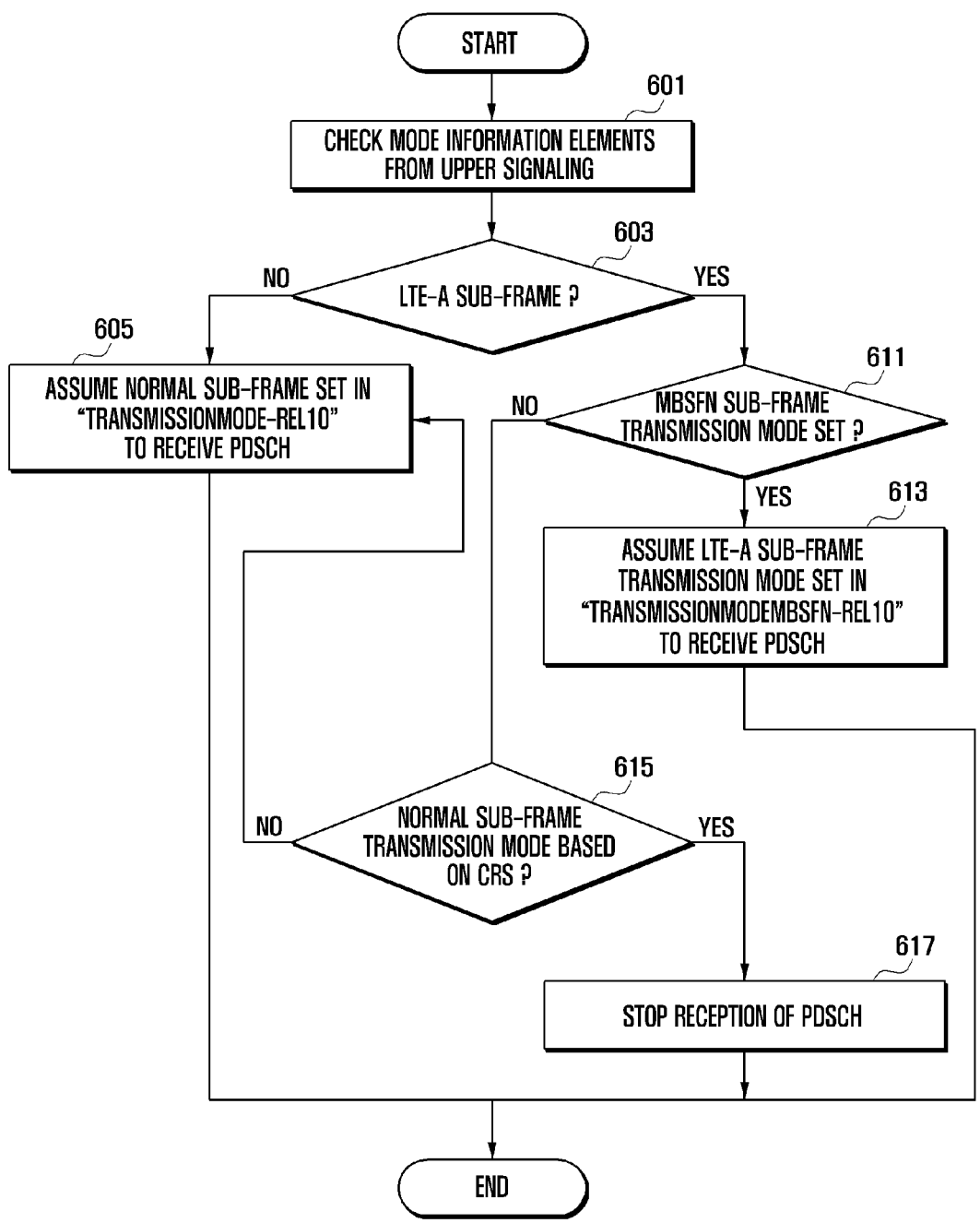
FIG. 9 illustrates a method for using a reference signal by a receiver according to a second embodiment of the present invention.

FIG. 9 illustrates a method for using a reference signal by a receiver according to a second embodiment of the present invention.

Referring to FIG. 9, a receiver of an LTE-A system determines mode information elements, namely, "transmissionMode-rel10" and "transmissionModeMBSFN-rel10" from a situation information element of upper signaling, namely, "AntennaInfoDedicated-rel10" in step 601. The receiver may recognize a transmission mode set in a receiver corresponding to a current sub-frame, and may recognize a transmission mode set in a corresponding receiver from transmission modes 1 to 10 in Table 1 based on a mode information element. The receiver determines whether a current sub-frame is an LTE-A sub-frame in step 603.

If the current sub-frame is a normal sub-frame, the receiver assumes a normal sub-frame set in "transmissionMode-rel10" to receive a data channel signal in step 605. The receiver may receive the data channel signal according to one of transmission modes 1 to 10 in Table 1. Conversely, if the current sub-frame is the LTE-A sub-frame, the receiver 611 checks "transmissionModeMBSFN-rel10" to determine whether a transmission mode for the LTE-A sub-frame is set in step 611. If the transmission mode for the LTE-A sub-frame is set, the receiver assumes an LTE-A sub-frame transmission mode set in "transmissionModeMBSFN-rel10" to receive the data channel signal in step 613. If the transmission mode for the LTE-A sub-frame is not set, the receiver determines whether a normal sub-frame transmission mode set in "transmissionMode-rel10" is based on a CRS in step 615. If the normal sub-frame transmission mode is based on the CRS, because there is no CRS in the LTE-A sub-frame, a base station stops reception of the data channel signal in step 617. If the normal sub-frame transmission mode is based on a DM-RS, because the DM-RS may be transferred to the LTE-A sub-frame, a base station assumes a normal sub-frame transmission mode set in "transmissionMode-rel10" to receive the data channel signal in step 605.

Figure 10:
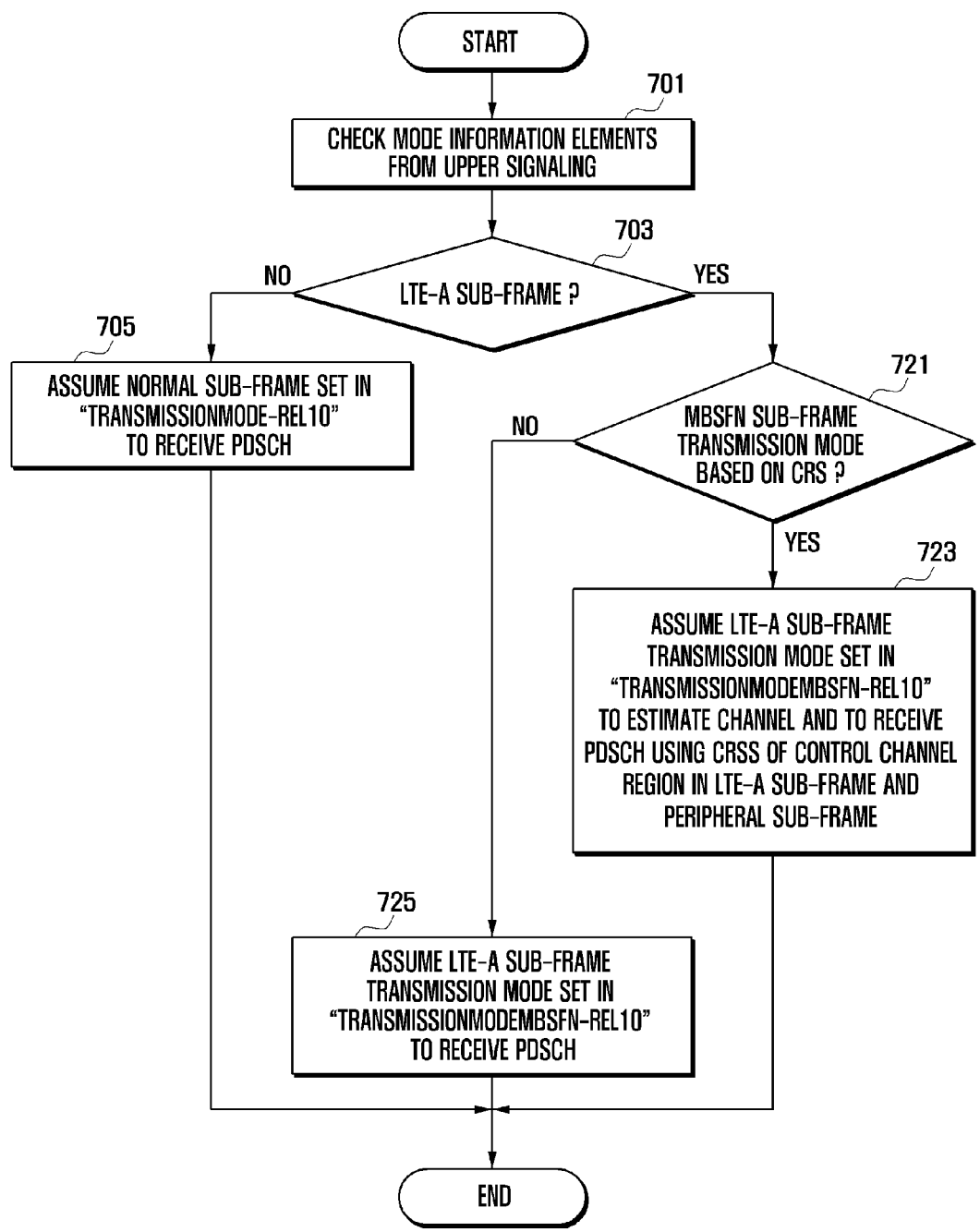
FIG. 10 illustrates a method for using a reference signal by a receiver according to a fifth embodiment of the present invention.

FIG. 10 illustrates a method for using a reference signal by a receiver according to a fifth embodiment of the present invention.

Referring to FIG. 10, a receiver of an LTE-A system determines mode information elements, namely, "transmission Mode-rel10" and "transmissionModeMBSFN-rel10" from a situation information element of upper signaling, namely, "AntennaInfoDedicated-rel10" in step 701. The receiver may recognize a transmission mode set in a receiver corresponding to a current sub-frame, and may recognize a transmission mode set in a corresponding received from transmission modes 1 to 10 in Table 1 based on a mode information element. The receiver determines whether a current sub-frame is an LTE-A sub-frame in step 703.

If the current sub-frame is a normal sub-frame, the receiver assumes a normal sub-frame transmission mode set in "transmissionMode-rel10" to receive a data channel signal in step 705. The receiver may receive the data channel signal according to one of transmission modes 1 to 10 in Table 1. Conversely, if the current sub-frame is the LTE-A sub-frame, the receiver 611 checks "transmissionModeMBSFN-rel10" to determine whether a transmission mode set for the LTE-A sub-frame is based on a CRS in step 721. If the transmission mode set for the LTE-A sub-frame is based on the CRS, the receiver assumes an LTE-A sub-frame transmission mode set in "transmissionModeMBSFN-rel10" to estimate a channel and to receive a data channel signal using a CRS of a control channel region in the LTE-A sub-frame and a CRS of a peripheral sub-frame in step 723.

The receiver may receive a data channel signal according to one of transmission modes 1 to 6 in Table 1. If the transmission mode for the LTE-A sub-frame is based on the DM-RS or the DRS, the receiver assumes an LTE-A sub-frame transmission mode set in "transmissionModeMBSFN-rel10" to receive the data channel signal in step 725. The receiver may receive the data channel signal according to one of transmission modes 7 to 10 in Table 1.

Although embodiments of the present invention have been described in detail hereinabove, it should be clearly understood that many variations and modifications of the basic inventive concepts herein taught which may appear to those skilled in the present art will still fall within the spirit and scope of the present invention, as defined in the appended claims.

What is claimed is:

1. A method for receiving data at a User Equipment (UE) from a base station in an LTE Advance (LTE-A) communication system, the method comprising: receiving information for at least one transmission mode among multiple transmission modes from the base station through higher layer signaling, wherein the at least one transmission mode includes at least one of transmission mode 9 (tm9) and transmission mode 10 (tm10); receiving information for a Multimedia Broadcast Multicast Service Single Frequency Network (MBSFN) sub-frame from the base station through the higher layer signaling; receiving Downlink Control Information (DCI) for a data signal, wherein a format of the DCI for the data signal is DCI format 1A; determining a transmission scheme corresponding to a current sub-frame based on the information for the transmission mode, the information for the MBSFN sub-frame, and the format of the DCI for the data signal; and processing the data signal based on the transmission scheme.

2. The method of claim 1, wherein at least one of the multiple transmission modes is based on a Common Reference Signal (CRS) and at least one of the multiple transmission modes is based on a Demodulation Reference Signal (DM-RS).

3. The method of claim 2, further comprising:
when the current sub-frame is the MB SFN sub-frame, receiving the data signal based on at least one transmission mode for the MB SFN sub-frame; and
when the current sub-frame is a normal sub-frame, receiving the data signal according to at least one transmission mode for the normal sub-frame.

4. The method of claim 1, wherein the format of the DCI includes information for a Demodulation-Reference Signal (DM-RS).

5. A method for transmitting data at a Base Station (BS) in an LTE Advance (LTE-A) communication system, the method comprising: transmitting information for at least one transmission mode among multiple transmission modes to a User Equipment (UE) through higher layer signaling, wherein the at least one transmission mode includes at least one of transmission mode 9 (tm9) and transmission mode 10 (tm10); transmitting information for a Multimedia Broadcast Multicast Service Single Frequency Network (MBSFN) sub-frame to the UE through the higher layer signaling; transmitting Downlink Control Information (DCI) for a data signal, wherein a format of the DCI for the data signal is DCI format 1A; determining a transmission scheme corresponding to a current sub-frame based on the information for the transmission mode, the information for the MBSFN sub-frame, and the format of the DCI for the data signal; and transmitting the data signal based on the transmission scheme.

6. The method of claim 5, wherein at least one of the multiple transmission modes is based on a Common Reference Signal (CRS) and at least one of the multiple transmission modes is based on a Demodulation Reference Signal (DM-RS).

7. The method of claim 5, wherein the format of the DCI includes information for a Demodulation-Reference Signal (DM-RS).

8. An apparatus for receiving data from a base station in an LTE Advance (LTE-A) communication system, the apparatus comprising a receiving controller and a data processor, the receiving controller and data processor configured to: receive, by the receiving controller, information for at least one transmission mode among multiple transmission modes from the base station through higher layer signaling, wherein the at least one transmission mode includes at least one of transmission mode 9 (tm9) and transmission mode 10 (tm10); receive, by the receiving controller, information for a Multimedia Broadcast Multicast Service Single Frequency Network (MBSFN) sub-frame from the base station through the higher layer signaling; receive, by the receiving controller, Downlink Control Information (DCI) for a data signal, wherein a format of the DCI for the data signal is DCI format 1A; determine, by the receiving controller, a transmission scheme corresponding to a current sub-frame based on the information for the transmission mode, the information for the MBSFN sub-frame, and the format of the DCI for the data signal; and process, by the data processor, the data signal based on the transmission scheme.

9. The apparatus of claim 8, wherein at least one of the multiple transmission modes is based on a Common Reference Signal (CRS) and at least one of the multiple transmission modes is based on a Demodulation Reference Signal (DM-RS).

10. The apparatus of claim 9, wherein the receiving controller is further configured to:
when the current sub-frame is the MBSFN sub-frame, receive the data signal based on at least one transmission mode for the MBSFN sub-frame; and
when the current sub-frame is a normal sub-frame, receive the data signal based on at least one transmission mode for the normal sub-frame.

11. The method of claim 8, wherein the format of the DCI includes information for a Demodulation-Reference Signal (DM-RS).

12. An apparatus for transmitting data in an LTE Advance (LTE-A) communication system, the apparatus comprising a transmission controller and a multiplexer, the transmission controller and the multiplexer configured to: transmit, by the transmission controller, information for at least one transmission mode among multiple transmission modes to a User Equipment (UE) through higher layer signaling, wherein the at least one transmission mode includes at least one of transmission mode 9 (tm9) and transmission mode 10 (tm10); transmit, by the transmission controller, information for a Multimedia Broadcast Multicast Service Single Frequency Network (MBSFN) sub-frame to the UE through the higher layer signaling; transmit Downlink Control Information (DCI) for a data signal, wherein a format of the DCI for the data signal is DCI format 1A; determine, by the transmission controller, a transmission scheme corresponding to a current sub-frame based on the information for the transmission mode, the information for the MBSFN sub-frame, and the format of the DCI for the data signal; and transmit, by the transmission controller, the data signal based on the transmission scheme.

13. The apparatus of claim 12, wherein at least one of the multiple transmission modes is based on a Common Reference Signal (CRS) and at least one of the multiple transmission modes is based on a Demodulation Reference Signal (DM-RS).

14. The method of claim 12, wherein the format of the DCI includes information for a Demodulation-Reference Signal (DM-RS).

* * * * *